(12) United States Patent
Rueth et al.

(10) Patent No.: US 9,841,335 B2
(45) Date of Patent: Dec. 12, 2017

(54) SENSOR FOR DETECTING A TEMPERATURE AND A PRESSURE OF A FLUID MEDIUM

(71) Applicant: Robert Bosch GmbH, Stuttgart (DE)

(72) Inventors: Falk Rueth, Filderstadt (DE); Alexander Lux, Ostfildern (DE)

( * ) Notice: Subject to any disclaimer, the term of this patent is extended or adjusted under 35 U.S.C. 154(b) by 384 days.

(21) Appl. No.: 14/592,052

(22) Filed: Jan. 8, 2015

(65) Prior Publication Data
US 2015/0192478 A1 Jul. 9, 2015

(30) Foreign Application Priority Data
Jan. 8, 2014 (DE) .................. 10 2014 200 093

(51) Int. Cl.
*G01L 9/00* (2006.01)
*G01K 1/14* (2006.01)
*G01L 19/00* (2006.01)

(52) U.S. Cl.
CPC .................. *G01L 9/00* (2013.01); *G01K 1/14* (2013.01); *G01L 19/0092* (2013.01); *G01K 2205/04* (2013.01); *Y10T 29/49002* (2015.01)

(58) Field of Classification Search
CPC ..... G01L 9/00; G01L 19/0092; G01L 19/148; G01K 1/14; G01K 13/02; G01K 2205/04; G01D 21/02; Y10T 29/49002
USPC ....... 73/866.5, 756, 700, 708; 374/142, 143, 374/148
See application file for complete search history.

(56) References Cited

U.S. PATENT DOCUMENTS 5,733,044 A * 3/1998 Rose ...................... G01K 13/02
374/144
6,272,913 B1 * 8/2001 Naegele ................. G01K 13/02
374/E13.006
(Continued)

FOREIGN PATENT DOCUMENTS

DE 10 2006 045924 4/2008
DE 10 2007 045179 4/2009
(Continued)

OTHER PUBLICATIONS

Konrad Reif (publisher) : "Sensoren im Kraftfahrzeug [Sensors in Motor Vehicles]", 1st edition 2010, pp. 134-137.

*Primary Examiner* — Jonathan Dunlap
(74) *Attorney, Agent, or Firm* — Norton Rose Fulbright US LLP; Gerard Messina

(57) ABSTRACT

A sensor for detecting a temperature and a pressure of a fluid medium includes at least one housing, at least one temperature sensor for detecting the temperature of the fluid medium and at least one pressure sensor element for detecting the pressure of the fluid medium. An activation and/or evaluation circuit is situated in the housing. The activation and/or evaluation circuit is situated on a circuit carrier. The activation and/or evaluation circuit is connected to the temperature sensor and the pressure sensor element. The temperature sensor has at least one connecting line including a connecting section for connecting to the activation and/or evaluation circuit. The circuit carrier has one recess. The connecting section is angled toward the connecting lines. The connecting section protrudes through the recess for connecting to the activation and/or evaluation circuit.

14 Claims, 2 Drawing Sheets

(56) References Cited

U.S. PATENT DOCUMENTS

| | | | | |
|---|---|---|---|---|
| 7,490,510 B2* | 2/2009 | Agami | ............... | G01K 13/02 |
| | | | | 73/170.02 |
| 8,038,345 B2* | 10/2011 | Stoll | ............... | G01D 11/245 |
| | | | | 374/143 |
| 8,454,232 B2* | 6/2013 | Stoll | ............... | F16B 33/02 |
| | | | | 374/142 |
| 9,097,564 B2* | 8/2015 | Stoll | ............... | G01D 11/245 |
| 9,121,775 B2* | 9/2015 | Gmelin | ............... | G01K 1/14 |
| 2007/0107510 A1* | 5/2007 | Agami | ............... | G01K 13/02 |
| | | | | 73/182 |
| 2010/0002745 A1* | 1/2010 | Stoll | ............... | G01D 11/245 |
| | | | | 374/143 |
| 2010/0284437 A1* | 11/2010 | Stoll | ............... | F16B 33/02 |
| | | | | 374/143 |
| 2011/0211614 A1* | 9/2011 | Gmelin | ............... | G01K 1/14 |
| | | | | 374/208 |
| 2012/0125130 A1* | 5/2012 | Stoll | ............... | G01D 11/245 |
| | | | | 73/866.5 |
| 2015/0323404 A1* | 11/2015 | Monichino | ............... | G01L 19/148 |
| | | | | 73/726 |

FOREIGN PATENT DOCUMENTS

| | | |
|---|---|---|
| DE | 10 2011 083174 | 3/2013 |
| IT | TO2012A001130 | * 12/2012 |
| WO | 02/37074 | 5/2002 |

* cited by examiner

SENSOR FOR DETECTING A TEMPERATURE AND A PRESSURE OF A FLUID MEDIUM

RELATED APPLICATION INFORMATION

The present application claims priority to and the benefit of German patent application no. 10 2014 200 093.9, which was filed in Germany on Jan. 8, 2014, the disclosure of which is incorporated herein by reference.

FIELD OF THE INVENTION

The present invention relates to a sensor for detecting a temperature and a pressure of a fluid medium.

BACKGROUND INFORMATION

In different industrial fields, such as, for example, the sciences or medical technology, one or multiple properties of fluid media must be detected. Generally, these properties may be any arbitrary physical and/or chemical properties of the fluid media, i.e., of the gases and/or fluids, such as, for example, temperature, pressure, flow properties or the like. One important example, to which the present invention is, however, not limited, is the detection of a pressure of the fluid medium. Pressure sensors are known, for example, from Konrad Reif (publisher): Sensoren im Kraftfahrzeug [Sensors in Motor Vehicles], 1st edition 2010, pp 134-136. Another example are temperature sensors, known, for example, from Konrad Reif (publisher): Sensoren im Kraftfahrzeug [Sensors in Motor Vehicles], 1st edition 2010, page 137.

Sensors for detecting a pressure and a temperature of a fluid medium are, for example, discussed in DE 10 2011 083 174 A1, DE 10 2006 045 924 A1 and WO 02/37074 A1.

Present high-pressure sensors with temperature measurement measure the temperature via a so-called NTC. For a rapid response time in the case of temperature change, this NTC is mounted inside the threaded part of the sensor in such a way that a thin wall thickness of the threaded part surrounds the NTC and that this area of the threaded part is also situated in the fluid medium. In order to enable mounting in this position, the threaded part is manufactured using metal injection molding. The mounting of the NTC is carried out as follows: The NTC is initially welded to a mounting aid, the so-called lead frame. Together with the lead frame, the NTC is then inserted into the NTC channel of the MIM threaded part. Finally, the printed board is mounted and the printed board is soldered to the pins of the lead frame. This type of assembly and this type of sensor are discussed, for example, in DE 10 2007 045 179 A1.

Despite the improvements effectuated by these sensors, there is still potential for optimization of known sensors. Thus the lead frame ensures a correct positioning of the NTC and the contact pins integrated into the lead frame in the last described sensor. However, the holes in the printed board must exactly align with the pins of the lead frame, which makes assembly more difficult and places high demands on the precision of the production steps.

SUMMARY OF THE INVENTION

Thus a sensor for detecting a temperature and a pressure of the fluid medium is provided which at least largely avoids the disadvantages of known sensors and the assembly of which in particular is made easier, since the lead frame may be dispensed with.

A sensor according to the present invention for detecting a temperature and a pressure and of a fluid medium includes at least one housing, at least one temperature sensor for detecting the temperature of the fluid medium and at least one pressure sensor element for detecting the pressure of the fluid medium. An activation and/or evaluation circuit is situated in the housing. The activation and/or evaluation circuit is situated on a circuit carrier. The activation and/or evaluation circuit is connected to the temperature sensor and the pressure sensor element. The temperature sensor has at least one connecting line including a connecting section to connect to the activation and/or evaluation circuit. According to the present invention it is now provided that the circuit carrier has one recess. The connecting section is angled toward the connecting line. The connecting section protrudes through the recess to connect to the activation and/or evaluation circuit.

The connecting section is angled toward the connecting line at an angle of 70° to 110° and which may be 90°. The recess may at least in part be surrounded by the circuit carrier. The recess may be configured as a hole. For example, the recess may be configured as a long hole. The long hole may have a longitudinal axis, the connecting section being situated in a projection onto a plane of the long hole at an angle of 0° to 90° toward the longitudinal axis, for example 45°. The activation and/or evaluation circuit may have at least one contact surface which is situated on the circuit carrier. The connecting section may be joined to the contact surface. The connecting section may in particular be integrally joined to the contact surface. For example, the connecting section is soldered or welded to the contact surface.

Furthermore, according to the present invention, a method for manufacturing a sensor for detecting a temperature and a pressure of a fluid medium is provided. The method includes the following steps, which may be in the specified sequence:

providing at least one housing,
assembling a circuit carrier including an activation and/or evaluation circuit in the housing,
connecting at least one temperature sensor for detecting the temperature of the fluid medium and at least one pressure sensor element for detecting the pressure of the fluid medium to the activation and/or evaluation circuit, the temperature sensor having at least one connecting line including a connecting section for connecting to the activation and/or evaluation circuit whereupon
a recess is implemented in the circuit carrier,
the connecting section is angled toward the connecting line, and
the connecting section is inserted through the recess for connecting to the activation and/or evaluation circuit.

One basic concept of the present invention is to angle the connecting lines of the temperature sensor and insert them through a recess in the circuit carrier, whereby the lead frame may be dispensed with. In this way, the connecting lines may be soldered or welded onto the circuit carrier from the top side.

Within the scope of the present invention, a pressure sensor element is to be understood to mean a sensor element which supplies the actual measuring signals regarding pressure and/or the measuring values which are used to detect the pressure of the fluid medium. For example, the pressure sensor element may be a sensor diaphragm configured as a measuring bridge having one or multiple piezoresistive element(s) and/or other types of sensitive elements, as is possible in pressure sensor elements. For further possible embodiments of this type of pressure sensor elements, reference may be made to the related art mentioned above, in particular Konrad Reif (publisher): Sensoren im Kraftfahrzeug [Sensors in Motor Vehicles], 1st edition 2010, pp 80-82 and 134-136. However, other embodiments are also possible in principle.

Other components may also be provided for producing a pressure sensor module. Those other components may, for example, be components for signal processing, a gel as a protective gel against the fluid medium and contacting, components for packaging of integrated circuits, and, in particular, bond wires and adhesives and the like, a plastic mold body having a stamped body and capacitors. The components for signal processing may be, for example, an application specific integrated circuit (ASIC), which is also known as a custom chip. Such a circuit is an electronic circuit which is implemented as an integrated circuit. The sensor element and the evaluation circuit (ASIC) may be situated on two separate chips or on one shared chip. For example, the pressure sensor module may have a glass base as well as a silicon chip situated on top of this base as sensor element in order to detect a pressure. Alternatively, welded steel modules with an etched measuring bridge may also be possible. For example, a measuring bridge, which may, for example, be configured as a Wheatstone bridge made of piezoresistive resistor elements, may be provided on the surfaces of the steel modules. The diaphragm required for detecting the pressure may be manufactured by etching the rear side of the silicon chip. The sensor element may be joined with the glass base and includes at least the measuring bridge.

Within the scope of the present invention, an activation and evaluation circuit is to be understood to mean a component which is suitable for signal processing. For example, the activation and evaluation circuit may be an application specific integrated circuit—ASIC. Such a circuit is an electronic circuit which is implemented as an integrated circuit.

Within the scope of the present invention, a circuit carrier is to be understood to mean any component which is capable of carrying a circuit. For example, the circuit carrier may be configured as a printed board. Within the scope of the present invention, a printed board is to be understood to mean a carrier for electronic components, which serves to mechanically fasten the electrical connection. The printed boards are made of electrically insulating material having attached, conducting connections, the so-called printed conductors.

Within the scope of the present invention, a temperature sensor is to be understood to mean all types of known temperature sensors, in particular so-called NTCs, i.e., temperature-dependent, electrical resistances with a negative temperature coefficient (NTC—negative temperature coefficient thermistor), of which the electrical resistance varies as a function of the temperature, decreasing in particular with increasing temperature. PTCs, i.e., electrical resistances with a positive temperature coefficient (PTC—positive temperature coefficient thermistor), of which the resistance increases with increasing temperature, are also conceivable. For further possible embodiments of this type of temperature sensors, reference may be made to the related art mentioned above, in particular Konrad Reif (publisher): Sensoren im Kraftfahrzeug [Sensors in Motor Vehicles], 1st edition 2010, page 137. However, other embodiments are also generally possible, for example, temperature diodes or SMD-NTCs (SMD—surface mount device).

Within the scope of the present invention, a circuit carrier is to be understood to mean a carrier for electronic components, which serves as a mechanical fastening and the electrical connection. The circuit carrier may, for example, be configured as a printed board. Printed boards are made of electrically insulating material having attached, conducting connections, the so-called printed conductors.

Within the scope of the present invention, integral joints are to be understood to mean all joints in which the connecting partners are held together with nuclear or molecular forces. Integral joints are permanent joints which may only be broken by destroying the connecting arrangement. Examples of integral joints are soldering, welding, gluing and vulcanizing.

With a sensor assembly of the type according to the present invention, the lead frame may be dispensed with. Instead, the wires are angled at the NTC, for example by 90°. The printed board includes a recess which is sufficiently large that the angled area of the NTC may be inserted through it. The angled wires may be soldered or welded onto the printed board from the top side.

Additional optional details and features of the present invention result from the following description of exemplary embodiments, which are schematically shown in the figures.

DETAILED DESCRIPTION

Figure 1:
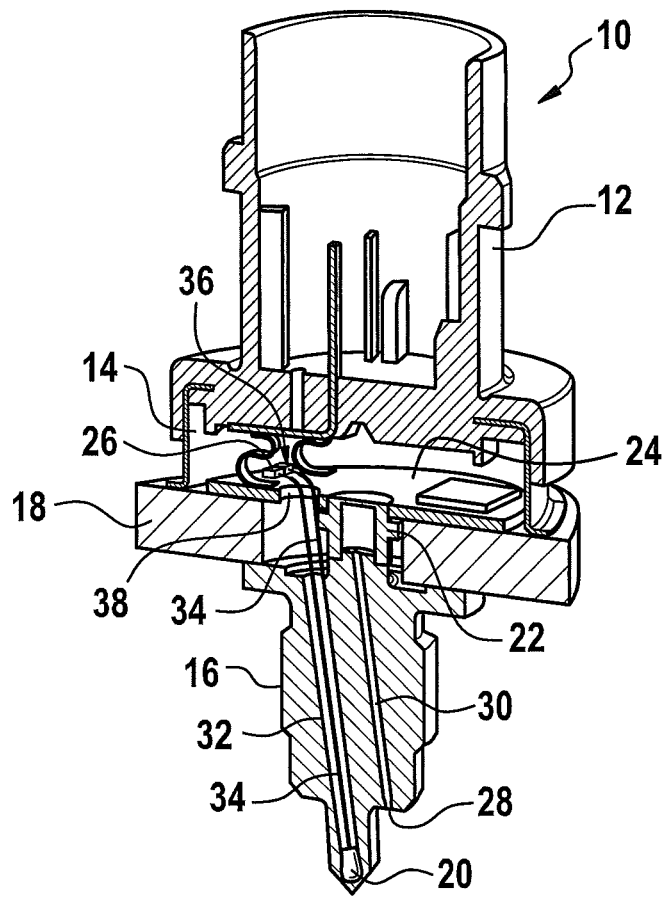
FIG. 1 shows a cross-sectional view of a sensor according to the present invention.

FIG. 1 shows a cross-sectional view of a sensor 10 according to the present invention for detecting a temperature and a pressure of a fluid medium. Sensor 10 may, for example, be configured to detect a pressure and a temperature of fuel inside a fuel line of an internal combustion engine, or to detect a pressure and a temperature of exhaust gasses in the exhaust gas flow of an internal combustion engine.

Sensor 10 includes a housing 12. Housing 12 defines a housing interior 14. Sensor 10 furthermore includes a pressure connection 16, a housing base 18 in the shape of a hexagon, a temperature sensor 20 for detecting the temperature of the fluid medium and a pressure sensor element 22 for detecting the pressure of the fluid medium. Temperature sensor 20 is configured as an NTC in the shown specific embodiment. For the embodiments of pressure sensor element 22, reference may be made to the related art mentioned above, in particular Konrad Reif (publisher): Sensoren im Kraftfahrzeug [Sensors in Motor Vehicles], 1st edition 2010, pp 80-82 and 134-136.

Sensor 10 furthermore includes a circuit carrier 24 such as, for example, a printed board including an activation and/or evaluation circuit 26 situated thereon. Activation and/or evaluation circuit 26 is connected to temperature sensor 20 and pressure sensor element 22. Circuit carrier 24 is situated on top of housing base 18. Pressure connection 16 is configured as a threaded connector and is an essentially cylindrical component having an opening 28 for the pressurized medium which is to be measured, which is situated inside a measuring space (not shown in detail), for example a fuel line, and a male thread (not shown in detail) in order to connect to the measuring space. Opening 28 is connected to a pressure channel 30 in pressure connection 16, which is closed by pressure sensor element 22 at its end opposite opening 28. Circuit carrier 24 including activation and/or evaluation circuit 26 situated thereon is situated on housing base 18 surrounding pressure sensor element 22.

Pressure connection 16 furthermore includes a temperature sensor channel 32, in which temperature sensor 20 is situated. For a rapid response time in the case of a temperature change, pressure connection 16 is implemented around temperature sensor channel 32 in such a way that a thin wall thickness of pressure connection 16 surrounds temperature sensor 20 and that this area of pressure connection 16 is also situated in the fluid medium. As described in greater detail below, activation and/or evaluation circuit 26 is connected to temperature sensor 20 and pressure sensor element 22.

Figure 2:
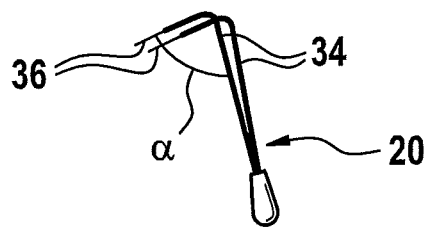
FIG. 2 shows a perspective view of a temperature sensor according to the present invention.

FIG. 2 shows a perspective view of temperature sensor 20 according to the present invention. Temperature sensor 20 includes at least one connecting line 34. Temperature sensor 20 shown in FIG. 2 includes two connecting lines 34. Connecting lines 34 each have one connecting section 36. Connecting section 36 is configured for connecting temperature sensor 20 to activation and/or evaluation circuit 26. Connecting section 36 is angled toward connecting lines 34. Connecting section 36 may be angled toward connecting lines 34 at an angle α of 70° to 110°. In one specific embodiment, connecting section 36 is angled toward connecting lines 34 at an angle α of 90°.

Figure 3:
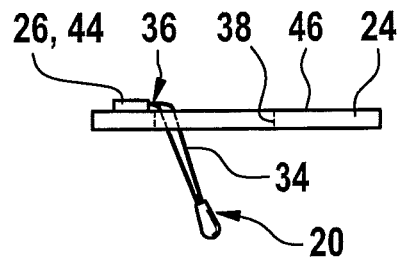
FIG. 3 shows a side view of a circuit carrier and the temperature sensor.

FIG. 3 shows a side view of circuit carrier 24 and temperature sensor 20. Circuit carrier 24 has one recess 38. Connecting section 36 of temperature sensor 20 protrudes through recess 38 to connect to activation and/or evaluation circuit 26. For this reason, the size of recess 38 is dimensioned in such a way that connecting section 36 fits completely through it.

Figure 4:
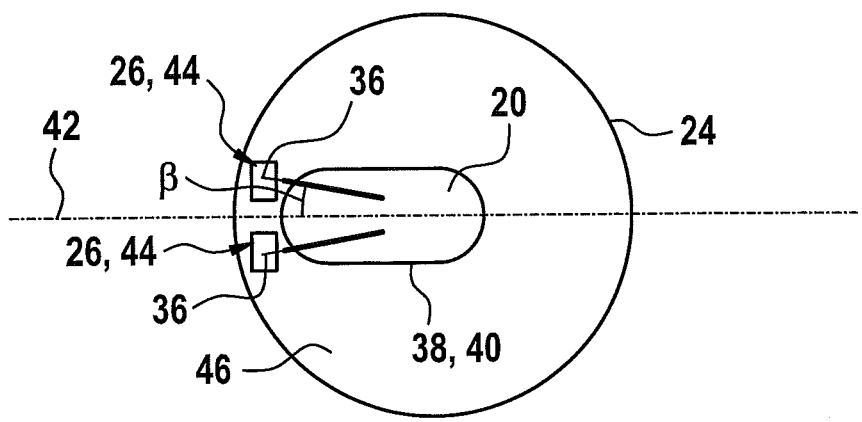
FIG. 4 shows a top view onto the circuit carrier and the temperature sensor.

FIG. 4 shows a top view onto circuit carrier 24 and temperature sensor 20. As is apparent from FIG. 4, recess 38 is at least in part surrounded by circuit carrier 24. In the exemplary embodiment shown in FIG. 4, recess 38 is completely surrounded by circuit carrier 24 and implemented inside it. Recess 38 is configured as a hole and, more precisely, as long hole 40. Long hole 40 has a longitudinal axis 42. Longitudinal axis 42 extends in parallel to a longest measurement of long hole 40. In a projection onto a plane of long hole 40, i.e., as seen in a top view, connecting section 36 is situated at an angle β of 0° to 90° toward longitudinal axis 42. In the exemplary embodiment shown in FIG. 4, connecting section 36 is situated at an angle β of 0° toward longitudinal axis 42, and thus in parallel to it. As is furthermore apparent in FIG. 4, activation and/or evaluation circuit 26 has at least one contact surface 44. In the exemplary embodiment shown in FIG. 4, activation and/or evaluation circuit 26 has two contact surfaces 44. Contact surfaces 44 are situated on the circuit carrier 24 in the lengthening of the extension direction of longitudinal axis 42. More precisely, contact surfaces 44 are situated on a top side 46 of circuit carrier 24 facing away from temperature sensor channel 32. One connecting section 36 each is connected to contact surface 44. Connecting section 36 is connected in particular with an integral bond to contact surface 44. For example, connecting section 36 is soldered or welded to contact surface 44.

Figure 5:
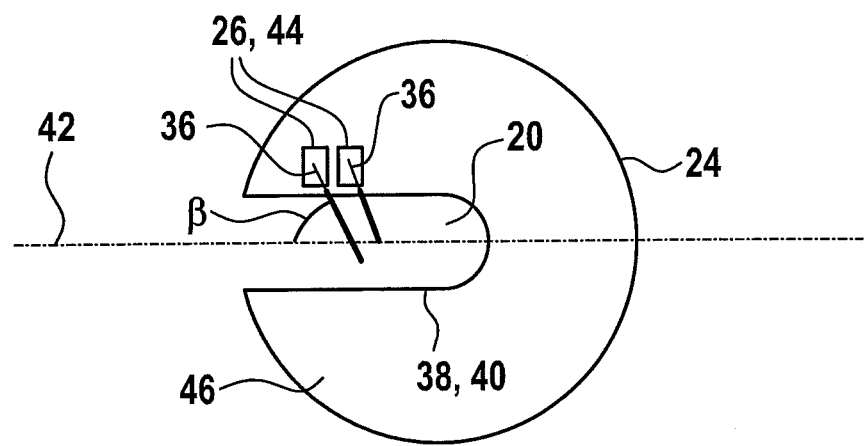
FIG. 5 shows a top view of a modification of the circuit carrier and the temperature sensor.

FIG. 5 shows a top view of a modification of circuit carrier 24 and temperature sensor 20. Only the differences from the exemplary embodiment shown in FIG. 4 are explained below and identical components are provided with the same reference numerals.

In the exemplary embodiment shown in FIG. 5, recess 38 is not completely surrounded by circuit carrier 24, but implemented as a long hole 40 open to one side. In a projection onto a plane of long hole 40, connecting section 36 is situated at an angle β of 60° toward longitudinal axis 42 of long hole 40. Contact surfaces 44 are thus situated on circuit carrier 24 next to long hole 40 and spaced offset to longitudinal axis 42.

Sensor 10 according to the present invention may, for example, be manufactured as follows: A housing 12 is initially provided. Housing 12 may be a housing as known from conventional sensors for detecting a pressure or a temperature of a fluid medium. Pressure sensor element 18 is mounted in housing interior 14 in such a way known per se that it is positioned as described above. Temperature sensor 20 is configured in such a way that connecting lines 34 have an angled connecting section 36. This may be achieved by bending connecting lines 34. For example, connecting section 36 is angled toward connecting lines 34 by 90°. Circuit carrier 24 is provided with a recess 38 as explained above, for example, with a recess 38 as shown in FIGS. 4 and 5. The formation of recess 38 may be achieved by stamping or sawing. Circuit carrier 24 is then mounted in housing interior 14 in such a way that it is arranged as described above.

Temperature sensor 20 is inserted through recess 38 from housing interior 14 into temperature sensor channel 32. The insertion of temperature sensor 20 through recess 38 may thus be carried out from top side 46 of circuit carrier 24, which faces away from temperature sensor channel 32. Connecting section 36 is then connected to activation and/or evaluation circuit 26 which is situated on circuit carrier 24. For example, connecting section 36 is soldered or welded to contact surfaces 44 of activation and/or evaluation circuit 26. With this assembly of sensor 10, circuit carrier 24 is freely accessible and a fastening of connecting section 36 with contact surfaces 44 may also be carried out from the top side.

What is claimed is:

1. A sensor for detecting a temperature and a pressure of a fluid medium, comprising:
    at least one housing including a pressure channel and a temperature sensor channel, the temperature sensor channel being separate from the pressure channel and the fluid medium;
    at least one temperature sensor for detecting the temperature of the fluid medium, at least a portion of the temperature sensor located in the temperature sensor channel;
    at least one pressure sensor element for detecting the pressure of the fluid medium in the pressure channel; and
    an activation and/or evaluation circuit situated in the housing, the activation and/or evaluation circuit being situated on a circuit carrier, the activation and/or evaluation circuit being connected to the temperature sensor and the pressure sensor element, the temperature sensor having at least one connecting line including a connecting section for connecting to the activation and/or evaluation circuit;

wherein the circuit carrier has a recess, and the connecting section is angled toward the connecting lines and protrudes through the recess for connecting to one or more contact surfaces of the activation and/or evaluation circuit, the one or more contact surfaces facing away from the temperature sensor channel.

2. The sensor of claim 1, wherein the connecting section is angled toward the connecting line at an angle of 70° to 110°.

3. The sensor of claim 1, wherein the recess is at least partly surrounded by the circuit carrier.

4. The sensor of claim 1, wherein the recess is a hole.

5. The sensor of claim 4, wherein the hole has a width in a first direction and a width in a second direction perpendicular to the first direction, the width in the first direction being greater than the width in the second direction.

6. The sensor of claim 5, wherein the hole has a longitudinal axis parallel to the first direction, and the connecting section as seen in a projection on a plane of the hole is situated at an angle of 0° to 90° toward the longitudinal axis.

7. The sensor of claim 1, wherein the at least one contact surface is situated on the circuit carrier.

8. The sensor of claim 1, wherein the connecting section is integrally joined to the contact area.

9. The sensor of claim 1, wherein the connecting section is soldered or welded to the contact area.

10. The sensor of claim 1, wherein the connecting section is angled toward the connecting line at an angle of 70° to 90°.

11. The sensor of claim 1, wherein the housing includes a base, and the activation and/or evaluation circuit is situated on the base.

12. The sensor of claim 1, wherein the housing includes a pressure connection portion extending away from the base, the pressure connection portion including the pressure channel and the temperature sensor channel.

13. The sensor of claim 1, wherein the temperature sensor channel is delimited by a wall adjacent to the temperature sensor through which the temperature sensor senses the temperature of the fluid medium.

14. A method for manufacturing a sensor for detecting a temperature and a pressure of a fluid medium, the method comprising:

providing at least one housing including a pressure channel and a temperature sensor channel, the temperature sensor channel being separate from the pressure channel and the fluid medium;

assembling a circuit carrier including an activation and/or evaluation circuit in the housing; and connecting at least one temperature sensor for detecting the temperature of the fluid medium and at least one pressure sensor element for detecting the pressure of the fluid medium to the activation and/or evaluation circuit, the temperature sensor having at least one connecting line including a connecting section for connecting to the activation and/or evaluation circuit;

wherein a recess is implemented in the circuit carrier, and wherein the connecting section is angled toward the connecting line, the connecting line is inserted through the recess into the temperature sensor channel, and the connecting section is connected to one or more contact surfaces of the activation and/or evaluation circuit, the one or more contact surfaces facing away from the temperature sensor channel.

* * * * *